United States Patent
Liden

(10) Patent No.: US 11,771,977 B2
(45) Date of Patent: Oct. 3, 2023

(54) COMPUTATIONALLY CUSTOMIZING INSTRUCTIONAL CONTENT

(71) Applicant: Microsoft Technology Licensing, LLC, Redmond, WA (US)

(72) Inventor: Lars Hasso Liden, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/326,276

(22) Filed: May 20, 2021

(65) Prior Publication Data

US 2022/0370882 A1 Nov. 24, 2022

(51) Int. Cl.
*A63B 24/00* (2006.01)
*G06F 3/0484* (2022.01)
(Continued)

(52) U.S. Cl.
CPC ...... *A63B 71/0622* (2013.01); *A63B 24/0062* (2013.01); *A63B 24/0075* (2013.01); *G06F 3/0484* (2013.01); *G10L 15/22* (2013.01); *H04L 67/535* (2022.05); *A63B 2071/063* (2013.01); *A63B 2071/0638* (2013.01); *A63B 2220/30* (2013.01); *A63B 2220/40* (2013.01);
(Continued)

(58) Field of Classification Search
CPC . A63B 71/06; A63B 71/0622; A63B 24/0062; A63B 24/0075; A63B 2071/063; A63B 2071/0638; A63B 2220/30; A63B 2220/40; A63B 2220/807; A63B 2220/808; A63B 2220/833; G06F 3/048; G06F 3/0484; H04L 67/535; G10L 15/22; G10L 2015/225; G09B 19/003; G09B 5/12
See application file for complete search history.

(56) References Cited

U.S. PATENT DOCUMENTS 6,902,513 B1 6/2005 Mcclure
8,533,746 B2 9/2013 Nolan et al.
(Continued)

FOREIGN PATENT DOCUMENTS

WO WO-2019147811 A1 * 8/2019 ......... A63B 71/0622

OTHER PUBLICATIONS

"International Search Report & Written Opinion issued in PCT Application No. PCT/US22/026616", dated Aug. 5, 2022, 11 Pages.

*Primary Examiner* — Jennifer N Welch
*Assistant Examiner* — Kuang F Chen
(74) *Attorney, Agent, or Firm* — Calfee, Halter & Griswold LLP

(57) ABSTRACT

A computing system causes instructional media to be played on a device to a user. An instructor in the instructional media provides guidance as to how to perform an activity when the instructional media is played on the device. The computing system obtains user data pertaining to performance of the activity by the user. The computing system generates a user-customized portion of the instructional media based upon the user data and a computer-implemented model. The computing system causes the user-customized portion to be played on the device to the user, where the device emits audible words reproduced in a voice of the instructor, where the audible words are based upon the user data, and further where the device displays generated images of the instructor depicting the instructor speaking the audible words as the device emits the audible words.

20 Claims, 9 Drawing Sheets

(51) Int. Cl.
*A63B 71/06* (2006.01)
*H04L 67/50* (2022.01)
*G10L 15/22* (2006.01)
*G09B 19/00* (2006.01)

(52) U.S. Cl.
CPC ... *A63B 2220/807* (2013.01); *A63B 2220/808* (2013.01); *A63B 2220/833* (2013.01); *G09B 19/003* (2013.01); *G10L 2015/225* (2013.01)

(56) References Cited

U.S. PATENT DOCUMENTS

| | | | |
|---|---|---|---|
| 10,904,488 B1* | 1/2021 | Weisz | G06V 10/774 |
| 2009/0098981 A1* | 4/2009 | Del Giorno | G16H 20/30 |
| | | | 482/9 |
| 2014/0244008 A1 | 8/2014 | Kennett et al. | |
| 2016/0073895 A1* | 3/2016 | Daly | G16H 20/30 |
| | | | 600/549 |
| 2016/0163224 A1 | 6/2016 | Rauhala et al. | |
| 2017/0039480 A1 | 2/2017 | Bitran et al. | |
| 2017/0206794 A1 | 7/2017 | Baker | |
| 2018/0193699 A1* | 7/2018 | DeBates | A61B 5/224 |
| 2018/0318647 A1 | 11/2018 | Foley et al. | |
| 2020/0134151 A1* | 4/2020 | Magi | G06F 21/35 |
| 2021/0093920 A1* | 4/2021 | Poulin | A61B 5/1128 |
| 2022/0314078 A1* | 10/2022 | Watterson | G16H 20/30 |

* cited by examiner

COMPUTATIONALLY CUSTOMIZING INSTRUCTIONAL CONTENT

BACKGROUND

Computer-executable instructional applications have soared in popularity in recent years. In general, an instructional application presents instructional media (e.g., an instructional video) on a display to a user, where the instructional media depicts an instructor who is instructing others in connection with performing an activity. The user then attempts to perform the activity based upon instructions set forth by the instructor. In one example, the instructional media depicts a fitness instructor who is setting forth instructions and/or motivation with respect to performance of a fitness activity (e.g., riding a stationary bicycle, running on a treadmill, performing yoga, etc.). The user views the fitness instructor and attempts to perform the activity in accordance with the instructions set forth by the fitness instructor. In another example, the instructional media depicts a music instructor setting forth instructions for performing a musical activity (e.g., playing an instrument, singing, etc.). The user, based upon instructions set forth by the music instructor in the instructional media, attempts to perform the musical activity. In yet another example, the instructional media depicts a healthcare professional setting forth instructions with respect to a healthcare activity (e.g., performing a surgery). The user views the instructional media and attempts to perform the healthcare activity based upon the instructions set forth by the healthcare professional in the instructional media.

Some instructional applications livestream instructional media over a network to a plurality of computing devices operated by a plurality of users, where an instructor in the instructional media is providing instruction with respect to an activity in real-time as the plurality of computing devices display the instructional media to their respective users. As the instructional media is livestreamed, the instructor may provide customized feedback with respect to performance of the activity to specific users (e.g., via a video camera and microphone of a computing device of the instructor). However, due to time constraints, the ability of the instructor to provide feedback is limited, especially when the instructional media is streamed to a relatively large number of users. Subsequent to the instructional media being livestreamed, an instructional application may present a recording of the instructional media to users who were unable to view the livestream, but nevertheless want to watch the instructional media; however, such users are unable to receive customized feedback from the instructor.

SUMMARY

The following is a brief summary of subject matter that is described in greater detail herein. This summary is not intended to be limiting as to the scope of the claims.

Various technologies pertaining to customizing instructional content for a user are described herein. With more particularity, a computing system is described herein that is configured to generate a user-customized portion of instructional media, where the user-customized portion is generated based upon user data for the user and a computer-implemented model for an instructor who is depicted in the instructional media. The user-customized portion includes audible words generated in a voice of the instructor that are based upon the user data and generated images of the instructor, wherein the generated images depict the instructor speaking the audible words.

In operation, a computing system causes instructional media (e.g., an instructional video) to be played on a device to a user. As the instructional media is played on the device, an instructor in the instructional media provides guidance as how to perform an activity. For instance, the instructional media may depict the instructor performing the activity. Example activities include exercise activities, musical activities, and healthcare-related activities. The instructional media is either pre-recorded or livestreamed to a device of the user in real-time as the instructor is setting forth instructions with respect to the activity in view of a video camera. As the user views the instructional media on the display, the user may attempt to perform the activity based upon the instructions set forth by the instructor. The computing system obtains user data for the user, where the user data pertains to performance of the activity by the user. The user data may be historical user data of the user with respect to the activity and/or the user data may be data gathered in real-time from a video camera, a microphone, sensors of the device, or other suitable source.

The computing system generates a user-customized portion of the instructional media based upon the user data and a computer-implemented model that has been generated based upon audiovisual data of the instructor. With more particularity, the model takes the user data as input and outputs audio content and video content. The audio content includes audible words that are generated in a voice of the instructor, where the audible words are based upon the user data. The video content includes generated images of the instructor, where the generated images depict the instructor uttering the audible words. The audio content and the video content are synced such that the instructor appears to be individually addressing the user in the user-customized portion of the instructional media, without requiring the instructor to physically utter the words; this technology is sometimes referred to as "deepfake" technology. The computing system causes the user-customized portion of the instructional media to be played on the device. In an example where the activity is riding a stationary bicycle, the user-customized portion may depict the instructor saying "Great Job User! You are averaging 15 miles per hour in your second bicycle riding class! Keep up the good work!"

The above-described technologies present various advantages over conventional instructional applications. First, vis-à-vis deep fake technology, the computing system described above is able to generate user-customized portions of instructional media without requiring an instructor to manually record such portions for each individual user. Thus, the computing system scales well to many different users. Second, from a user perspective, the user-customized portions of instructional media generated via deepfake technology may be indistinguishable from the instructor actually providing personalized feedback to the user, and hence user experience may be improved. Third, unlike conventional instructional applications, the computing system described above is able to provide user-customized instructional media to computing devices of users even when the instructional media is prerecorded. Fourth, via the collection of real-time and historical user data, the computing system described above is able to present a richer user-customized experience in comparison to conventional technologies.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
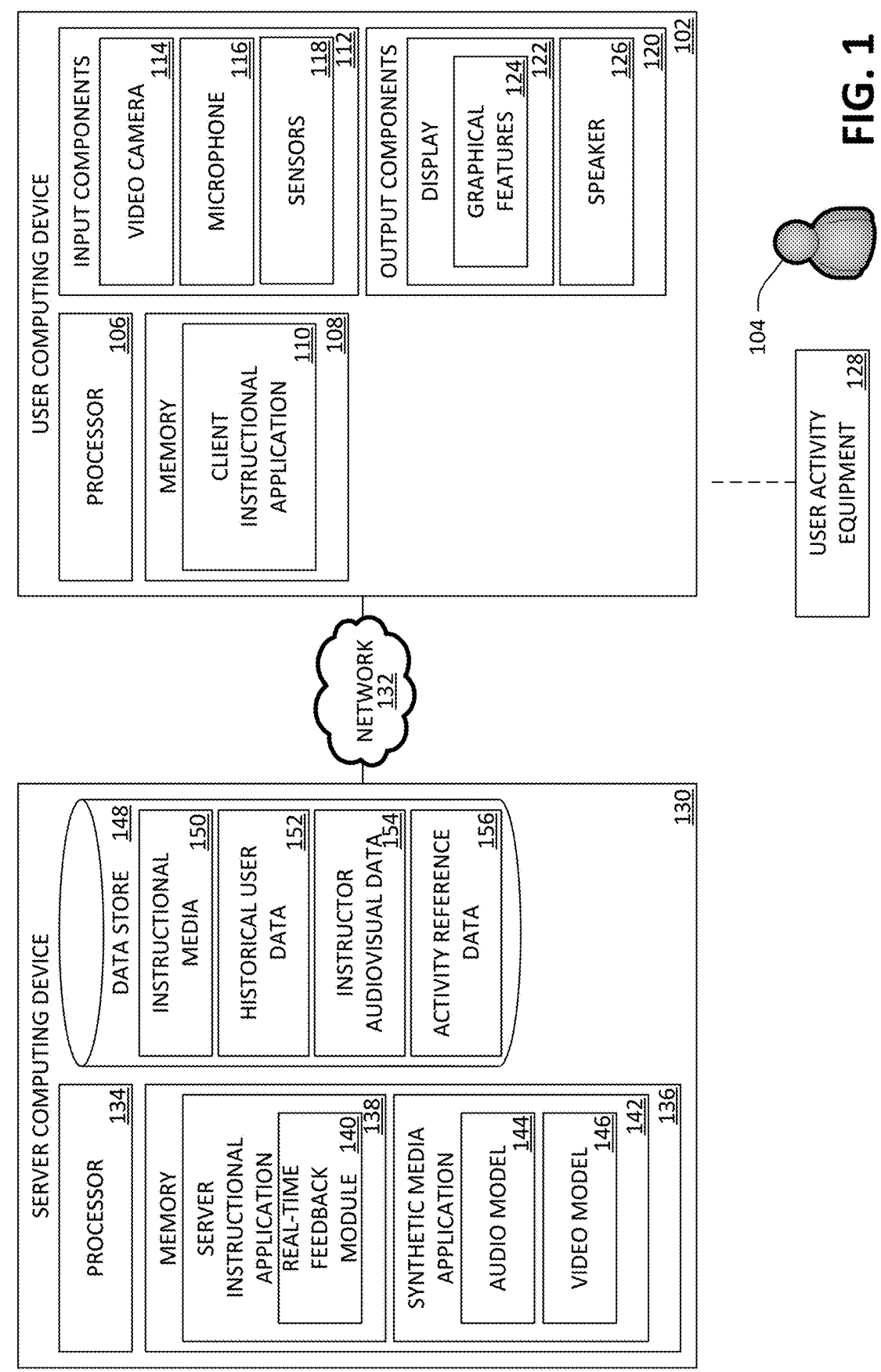
FIG. 1 is a functional block diagram of a computing system that facilitates customizing instructional content for a user.

Various technologies pertaining to customizing instructional content for a user are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

As noted above, conventional instructional applications do not enable a user to receive customized feedback from an instructor with respect to an activity performed by the user unless the user attends a livestream of the instructional media and the instructor has time to provide the customized feedback to the user (e.g., which can be difficult when a large number of users are watching the instructional media). As a result, conventional instructional applications do not provide customized feedback to the user when the user views a recorded (i.e., non-live) version of the instructional media. Furthermore, even when conventional instructional applications livestream instructional media to a computing device of the user, the user may still not receive customized feedback from the instructor when the livestreamed instructional media is livestreamed to many different computing devices of different users. For instance, when instructional media is displayed to thousands of users, it is not practical for the instructor to provide feedback to each user.

To address this issue, a computing system is described herein that is configured to generate a user-customized portion of instructional media (e.g., an instructional video) in which an instructor appears to provide user-customized guidance and/or motivation to the user with respect to performance of an activity, but where the instructor in the user-customized portion is actually a "deepfake" of the instructor generated via a computer-implemented model. The computing system causes the user-customized portion of the instructional media to be played on a device.

Briefly, a computing system causes instructional media to be played on a device to a user. As the instructional media is played on the device, an instructor in the instructional media provides guidance as how to perform an activity. For instance, the instructional media may depict the instructor performing the activity. Example activities include exercise activities, musical activities, and healthcare-related activities. As the user views the instructional media on the display, the user may attempt to perform the activity in accordance with the instructions. The computing system obtains user data for the user, where the user data pertains to performance of the activity by the user. The user data may be historical user data of the user with respect to the activity and/or the user data may be data gathered in real-time from a video camera, a microphone, sensors of the device, etc. In another example, the user data may be based upon explicit feedback provided by the user.

The computing system generates a user-customized portion of the instructional media based upon the user data and a computer-implemented model that has been generated based upon audiovisual data of the instructor. With more particularity, the model takes the user data as input and outputs audio content and video content. The audio content includes audible words that are generated in a voice of the instructor, where the audible words are based upon the user data. The video content includes generated images of the instructor, where the images are generated to depict the instructor uttering the audible words. The audio content and the video content are synced such that the instructor appears to be individually addressing the user in the user-customized portion of the instructional media, without requiring the instructor to physically utter the words. In other words, the generated audio and video content are a "deepfake". The computing system causes the user-customized portion of the instructional media to be played on the device, where the customized portion is surrounded by non-customized portions of recorded instructional media. The user-customized portion may also be based upon reference data for the activity such that the user-customized portion provides feedback as to how the user can correct his/her performance of the activity such that the activity is performed correctly. In an example where the activity is playing a song on a musical instrument, the user-customized portion may depict the instructor saying "You are doing a good job for only your second lesson, but you were a little flat in the second half of song. Try a higher pitch next time."

The above-described technologies present various advantages over conventional instructional applications. First, vis-à-vis deepfake technology, the computing system described above is able to generate user-customized portions of instructional media without requiring an instructor to manually record such portions for each individual user. Thus, the computing system scales well to many different users. Second, from a user perspective, the user-customized portions of instructional media generated via deepfake technology may be indistinguishable from the instructor actually providing personalized feedback to the user in a live video, and hence user experience may be improved. Third, unlike conventional instructional applications, the computing system described above is able to provide user-customized instructional media to computing devices of users even when the instructional media are prerecorded. Fourth, via the collection of real-time and historical user data, the computing system described above is able to present a richer user-customized experience in comparison to conventional technologies.

With reference to FIG. 1, an exemplary computing system 100 that facilitates customizing instructional content for a user is illustrated. The computing system 100 includes a user computing device 102 that is operated by a user 104. According to embodiments, the user computing device 102 is a desktop computing device, a laptop computing device, a tablet computing device, a smartphone, a computing device built into exercise equipment, a kiosk, etc. According to embodiments, some or all of the user computing device 102 is worn by the user 104. In an example, the user computing device 102 may be or include a virtual reality (VR) headset or an augmented reality (AR) headset that is worn over at least one eye of the user 104.

The user computing device 102 comprises a processor 106 and memory 108, where the memory 108 has a client instructional application 110 loaded therein. As will be described in greater detail below, the client instructional application 110, when executed by the processor 106, is configured to present customized instructional media (e.g., customized instructional videos) to the user 104, where the customized instructional media present guidance to the user 104 as to how to perform activities. The client instructional application 110 may be a web-based application that is presented within a web browser or a stand-alone application. As will be described in greater detail below, the client instructional application 110 includes a video player that renders video for presentment to the user 104. In some embodiments, the client instructional application 110 can also be configured to update video to include user-customized portions.

The user computing device 102 further includes input components 112. In general, the input components 112 enable the user 104 to set forth input to the user computing device 102. The input components 112 also enable the user computing device 102 to ascertain characteristics of the user 104 and/or an environment of the user 104. The input components 112 may include a video camera 114 that is configured to capture a plurality of sequential images (i.e., video imagery) of the user 104 and/or the environment of the user 104. The video camera 114 may be integrated into the user computing device 102 or the video camera 114 may be separately connected to the user computing device 102. The input components 112 may also include a microphone 116 that is configured to capture audible noises uttered by the user 104 and/or audible noises in the environment of the user 104. The microphone 116 may be integrated into the user computing device 102 or the microphone 116 may be separately connected to the user computing device 102. Thus, according to embodiments, the client instructional application 110 utilizes the video camera 114 and the microphone 116 to capture video of the user 104, where the video includes sequential images and corresponding audio. Although not depicted in FIG. 1, it is to be understood that the input components 112 may also include a mouse, a keyboard, a trackpad, a scroll wheel, buttons, a touchscreen, and so forth.

According to embodiments, the input components 112 also include sensors 118 that are configured to capture sensor data of the user 104 and/or the environment of the user 104. The sensors 118 may include a heart rate monitor, a blood pressure monitor, a gyroscope, a speedometer, an odometer, an accelerometer, a tonal sensor, an olfactory sensor, or any other suitable sensor device. Likewise, the sensor data may be a heart rate of the user 104 as measured by the heart rate monitor, a blood pressure of the user 104 as measured by the blood pressure monitor, an orientation and/or angular velocity of the user 104 and/or an orientation and/or angular velocity of the user activity equipment 128 as measured by the gyroscope, a speed of the user 104 and/or a speed of the user activity equipment 128 as measured by the speedometer, a distance the user 104 has traveled and/or a distance the user activity equipment 128 has traveled as measured via the odometer, an acceleration of the user 104 and/or an acceleration of the user activity equipment 128 as measured by the accelerometer, a tone produced by the user 104, a tone in the environment of the user 104, and/or a tone produced by the user activity equipment 128 as measured by the tonal sensor, or a smell produced by the user 104, a smell in the environment of the user 104 and/or a smell of the user activity equipment 128 as measured by the olfactory sensor. It is to be understood that some or all of the sensors 118 may be integrated into the user computing device 102 or that some or all of the sensors 118 may be separately connected to the user computing device 102. According to embodiments, the video camera 114 and/or the microphone 116 may be considered to be sensors. As such, images captured by the video camera 114 and/or audio captured by the microphone 116 may be considered to be sensor data.

The user computing device 102 further includes output components 120. In general, the output components 120 enable data to be presented to the user 104. The output components 120 include a display 122, where graphical features 124 are presented thereon. The display 122 may be integrated into the user computing device 102 or the display 122 may be separately connected to the user computing device 102 via a wired or wireless connection. As will be described in greater detail below, the graphical features 124 are included in instructional media presented on the display by the client instructional application 110. According to embodiments, the display 122 is a touchscreen display. According to other embodiments, the display 122 is a VR display or an AR display that is worn over at least one eye of the user 104. The output components 120 further include a speaker 126 that is configured to emit audible noises to the user 104. Thus, the client instructional application 110 utilizes the display 122 and the speaker 126 to present instructional videos to the user 104. The speaker 126 may be integrated into the user computing device 102 or the speaker 126 may be separately connected to the user computing device 102 via a wired or wireless connection. Although not depicted in FIG. 1, it is to be understood that the output components 120 may include a haptic feedback device.

The user 104 may utilize user activity equipment 128 to perform activities concurrently with viewing instructional media and/or after viewing instructional media (or a portion thereof). In an example where the activity is an exercise activity, the activity equipment 128 may be exercise equipment, such as a stationary bicycle, a treadmill, or a yoga mat. In an example where the activity is a musical activity, the user activity equipment 128 may be a musical instrument, such as a violin or a flute. In an example where the activity is performing a surgery, the user activity equipment 128 may be surgical equipment. According to embodiments, the user computing device 102 and the user activity equipment 128 are integrated together such that the user computing device 102 and the user activity equipment 128 form a single interconnected device. In a specific embodiment, the user computing device 102 is a tablet computing device that is coupled to a stationary bicycle (i.e., the user activity equipment 128), where the user 104 views the user activity equipment 128 as the user 104 rides the stationary bicycle. According to other embodiments, the user computing device 102 and the user activity equipment 128 are separate devices. Certain activities may not require equipment in order to be performed by the user 104. As such, it is to be understood that the user activity equipment 128 is optional. According to embodiments, the user activity equipment 128 includes a computing device (not shown in FIG. 1) that is in wired or wireless communication with the user computing device 102.

Figure 2:
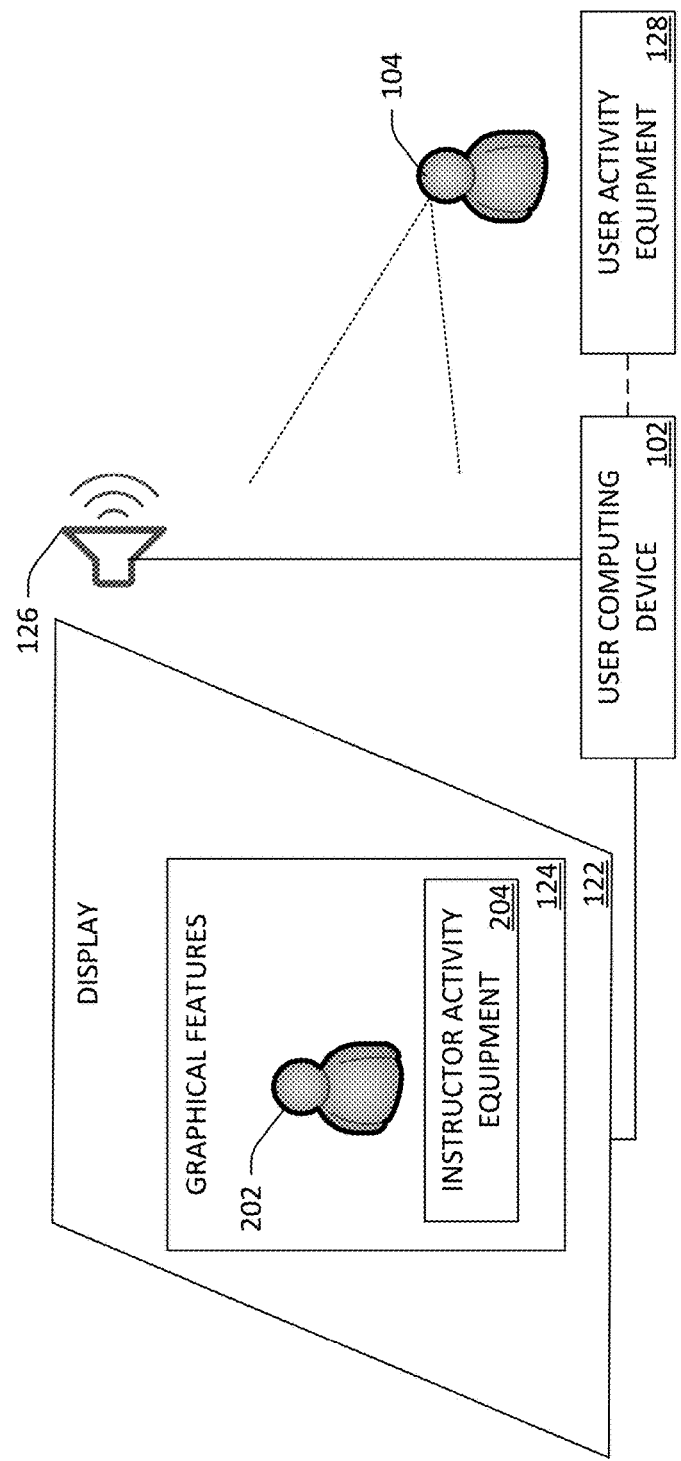
FIG. 2 is an illustration of an environment in which a user views instructional content.

Referring briefly now to FIG. 2, an example environment 200 in which the user 104 views instructional videos is illustrated. As depicted in FIG. 2, the user 104 views instructional media on the display 122 of the user computing device 102, where the instructional media depicts an instructor 202 setting forth instructions with respect to an activity (e.g., an exercise activity, a musical activity, a healthcare activity, etc.). The instructional media may also depict instructor activity equipment 204 that is utilized by the instructor 202 to provide instructions with respect to the activity. Imagery of the video is presented on the display 122 and audio of the video is emitted from the speaker 126.

Referring back to FIG. 1, the computing system 100 further includes a server computing device 130 that is in communication with the user computing device 102 by way of a network 132 (e.g., the Internet, intranet, etc.). According to embodiments, the server computing device 130 is a cloud-based computing device. The server computing device 130 comprises a processor 134 and memory 136. The memory 136 has a server instructional application 138 loaded therein. As will be described in greater detail below, the server instructional application 138, when executed by the processor 134, is configured to deliver customized instructional media (e.g., videos) to computing devices operated by users for presentment to the users. According to embodiments, the server instructional application 138 includes a real-time feedback module 140 (described in greater detail below).

The memory 136 further includes a synthetic media application 142. As will be described in greater detail below, the synthetic media application 142, when executed by the processor 134, is configured to manipulate audiovisual content depicting the instructor 202 such that the manipulated audiovisual content depicts the instructor 202 uttering words and/or performing actions that were not initially included in the audiovisual content (sometimes referred to as a "deepfake"), where the words and/or the actions are based upon user data for the user 104. The synthetic media application 142 includes an audio model 144 and a video model 146. In general, the audio model 144 is configured to generate audible output played over the speaker 126 that mimics a voice of the instructor 202 (e.g., audible output that has a similar and/or identical pitch, volume, timbre, and/or tone of the voice of the instructor 202). In general, the video model 146 is configured to generate video output displayed on the display 122 as part of the graphical features 124 that mimics an appearance of the instructor 202 (e.g., facial features of the instructor, such as lip movements) as the audible output generated by the audio model 144 is played over the speaker 126. Vis-à-vis the audio model 144 and the video model 146, the synthetic media application 142 can generate audiovisual imagery that depicts the instructor 202 speaking words and/or performing actions that the instructor 202 may have not actually spoken and/or performed. According to embodiments, the audio model 144 and/or the video model 146 are neural networks, such as a generative neural network. In an example, the audio model 144 and/or the video model 146 may be or include an autoencoder or a generative adversarial network (GAN). According to embodiments, the synthetic media application 142 accesses template videos of the instructor and modifies the template videos using the audio model 144 and the video model 146 to create audiovisual content depicting the instructor 202 uttering desired words and/or performing desired actions. In an example, a template video includes the instructor 202 uttering the phrase "Good job [blank]!" The synthetic media application 142 modifies the template video using the audio model 144, the video model 146, and an identifier for the user to create a video in which the "[blank]" is replaced by a name of the user 104 (e.g., "Good job Mike!").

Although not depicted in FIG. 1, it is to be understood that the synthetic media application 142 may include different pairs of audio models and visual models that are assigned to different instructions. For instance, the synthetic media application 142 may include a first audio model and a first video model that are assigned to a first instructor and that generates deepfake videos of the first instructor, a second audio model and a second video model that are assigned to a second instructor and that generate deepfake videos of the second instructor, and so forth.

Although the server instructional application 138 and the synthetic media application 142 are depicted as both executing in the memory 136 of the server computing device 130, in certain embodiments, the server instructional application 138 and the synthetic media application 142 execute on different computing devices that are in communication with one another. Furthermore, according to other embodiments, the server instructional application 138 and the synthetic media application 142 are comprised by a single application.

The server computing device 130 includes a data store 148. The data store 148 stores instructional media 150 (e.g., an instructional video). In general, the instructional media 150 includes audiovisual content that depicts the instructor 202 setting forth instructions with respect to an activity, where a portion of the instructional media 150 is customized for the user 104, where the customization occurs either prior to the instructional media 150 being played, while the instructional media 150 is being played, or a combination thereof. The instructional media 150 may be VR content or AR content. Although not depicted in FIG. 1, it is to be understood that the data store 148 may store different instructional media (e.g., videos) for different activities. Furthermore, it is to be understood that the data store 148 may store different instructional media (e.g., videos) for the same activity, where each instructional media is part of a series that provides guidance as to how to perform the activity. For instance, different instructional videos that are part of a series may emphasize different aspects of the activity. In an example where the activity is riding a stationary bicycle, a first instructional video may emphasize endurance in riding the stationary bicycle and a second instructional video may emphasize reaching a high speed in riding the stationary bicycle.

Figure 3:
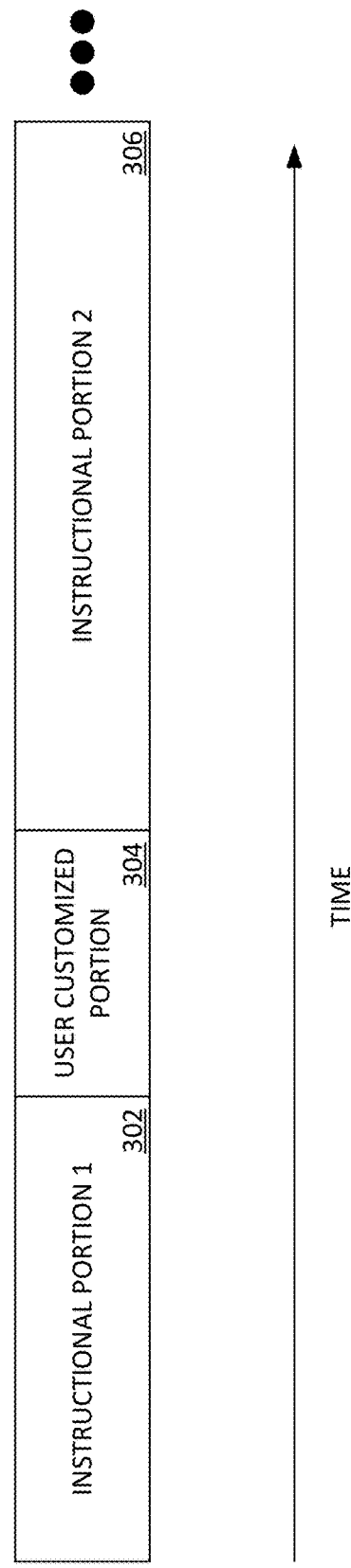
FIG. 3 is a functional block diagram of portions of instructional media.

Turning briefly now to FIG. 3, a functional block diagram of an example instructional media 300 is illustrated. The instructional media 300 may be or include the instructional media 150 or the instructional media 150 may be or include the instructional media 300. The instructional media 300 includes a first instructional portion 302 that spans a first period of time and a user-customized portion 304 that spans a second period of time. When played on the display 122, the first instructional portion 302 depicts the instructor 202 setting forth instructions with respect to an activity. The first instructional portion 302 is not customized to any particular user. In an example where the activity is riding a stationary bicycle, the first instructional portion 302 depicts the instructor 202 riding the stationary bicycle while providing guidance as to how to ride the bicycle. For instance, the guidance may include advice on postures to maintain and breathing techniques to utilize while riding the stationary bicycle.

As noted above, the instructional media 300 further includes the user-customized portion 304. The user-customized portion 304 is generated wholly or in part by the synthetic media application 142 and is customized for the user 104, where the user-customized portion 304 may be dynamically generated content (e.g., dynamically generated video). Referring jointly now to FIGS. 1 and 3, the data store 148 may store historical user data 152 of the user 104 (as well as historical user data for other users). The server instructional application 138 and/or the synthetic media application 142 can generate the user-customized portion 304 based upon the historical user data 152 and/or real-time user data gathered by the video camera 114, the microphone 116, and/or the sensors 118 as the user 104 performs an activity while the client instructional application displays the instructional media 150 (e.g., the first instructional portion 302) on the display 122 to the user 104. The historical user data 152 may include an identifier for the user 104 (e.g., a name of the user) and data pertaining to performance of the user 104 with respect to an activity. According to embodiments, the historical user data 152 may include data gathered by the video camera 114, the microphone 116, and/or the sensors 118 of the user computing device 102 as the user 104 performs the activity while viewing prior instructional videos pertaining to the activity. According to embodiments, the historical user data 152 may include data gathered by the video camera 114, the microphone 116, and the sensors 118 of the user computing device 102 as the user 104 performs the activity outside of viewing of the prior instructional media (i.e., data pertaining to self-guided practice of the user 104). According to embodiments, the historical user data 152 may include self-reported data of the user 104. It is to be understood that the data store 148 may store historical user data of the user 104 for different activities of the user 104. Furthermore, it is to be understood that the data store 148 may store historical user data for many different users. In an example where the activity is riding a stationary bicycle, the user-customized portion 304 depicts the instructor 202 "calling out" the user 104 by name (e.g., "Great job Mike! keep it up!") as well as providing details with respect to performance of the activity (e.g., "This is your fourth class this month Mike! You are beating last week's speeds.").

In the example depicted in FIG. 3, the instructional media 150 further includes a second instructional portion 306 that spans a third period of time that occurs after the user-customized portion 304. When played on the display 122, the second instructional portion 306 depicts the instructor 202 setting forth instructions with respect to the activity (or a different aspect of the activity than an aspect depicted in the first instructional portion 302). It is to be understood that the instructional media may include many different instructional portions and/or many different user-customized portions. Furthermore, it is to be understood that the instructional portions and the user-customized portions may occur in any order. In an example, the user-customized portion 304 of the instructional media 300 may be played prior to the first instructional portion 302 of the instructional media 300 being played.

Referring back to FIG. 1, the data store 148 further stores instructor audiovisual data 154 of the instructor 202. The instructor audiovisual data 154 may include a plurality of videos in which the instructor 202 sets forth instruction with respect to an activity. The instructor audiovisual data may also include videos of the instructor 202 providing instruction with respect to different activities, audio of the instructor 202 speaking, and/or still-images of the instructor 202. The synthetic media application 142 utilizes the instructor audiovisual data 154 to generate (e.g., train) the audio model 144 and/or the visual model 146 such that the synthetic media application 142 is able to generate deepfakes of the instructor 202. Although not depicted in FIG. 1, it is to be understood that the data store 148 may store instructor audiovisual data for many different instructors.

According to embodiments, the data store 148 stores activity reference data 156 for an activity. The activity reference data 156 includes data pertaining to how to perform an activity and/or metrics to gauge performance of the activity. In an example where the activity is riding a stationary bicycle (over the course of a series of instructional videos), the reference data 156 includes milestones (e.g., a speed that the user 104 is to maintain and a duration of time for which the user 104 is to maintain the speed) that the user 104 should be achieving. In an example where the activity is performing a yoga pose, the activity reference data 156 includes images of how the yoga pose should appear. In an example where the activity is performing a surgical operation, the activity reference data 156 includes images of sequential steps of the surgery. As will be described in greater below, the real-time feedback module 140 of the server instructional application 138 may utilize real-time user data for the user 104 and/or the historical user data 152 for the user 104 in order to generate feedback for the user 104 with respect to performance of the activity by the user 104 as the instructional media 150 is played to the user 104. Although not depicted in FIG. 1, it is to be understood that the data store 148 may store activity reference data for many different activities. Furthermore, it is to be understood that the instructional media 150, the historical user data 152, the instructor audiovisual data 154, and/or the activity reference data 156 may be retained in different data stores of different computing devices.

An example of operation of the computing system 100 is now set forth. The server computing device 130 obtains (e.g., receives or generates) the instructor audiovisual data 154 for the instructor 202. The server computing device 130 generates (e.g., trains) the audio model 144 and the video model 146 based upon the instructor audiovisual data 154. Alternatively, another computing device (not shown in FIG. 2) may train the audio model 144 and the video model 146 based upon the instructor audiovisual data 154 and provide the server computing device 130 with the audio model 144 and the video model 146.

According to embodiments, the server computing device 130 receives (a recording of) the instructional media 150 and stores the instructional media 150 in the data store 148. According to other embodiments, the instructional media is livestreamed (described in greater detail below) to a plurality of user computing devices operated by a plurality of users as the instructor 202 performs an activity in view of a video camera and a microphone of a computing device of the instructor.

The client instructional application 110 receives an indication that the user 104 wishes to view the instructional media 150. Upon receiving the indication, the client instructional application 110 transmits an identifier for the instructional media 150 to the server instructional application 138. According to embodiments, the client instructional application 110 also transmits an identifier for the user 104 to the server instructional application 138. According to the embodiments, the server instructional application 138 executes a search over the data store 148 based upon the identifier for the user 104 to retrieve the historical user data 152 for the user 104. According to embodiments where the instructional media 150 is prerecorded and stored in the data store 148, the server instructional application 138 executes a search over the data store 148 based upon the identifier to retrieve the instructional media 150.

The server instructional application 138 causes the instructional media 150 to be played on the user computing device 102 (e.g., using the display 122 and the speaker 126). According to some embodiments, the server instructional application 138 streams the instructional media 150. According to other embodiments, the server instructional application 138 transmits the instructional media 150 in its entirety to the client instructional application 110. The client instructional application 110 presents the instructional media 150 to the user 104 over the display 122 and the speaker 126 to enable the user 104 to view and listen to the instructional media 150. It is contemplated the user 104 attempts to perform the activity while the user computing device plays the instructional media 150.

As indicated above, the instructional media 150 includes (at least one) instructional portion. The instructional portion of the instructional media 150 includes media (e.g., video) of the instructor 202 providing guidance as to how to perform the activity. The instructional portion may be prerecorded or the instructional portion may be livestreamed. The instructional portion is not customized for any specific user.

The instructional media 150 also includes (at least one) user-customized portion that is customized for the user 104. The server instructional application 138 and the synthetic media application 142 communicate with one another to generate the user-customized portion of the instructional media 150. According to some embodiments, the server instructional application 138 and the synthetic media application 142 generate the user-customized portion before the client instructional application 110 begins to play the instructional media 150 on the display 122, as the client instructional application 110 plays the instructional media 150 on the display 122, or a combination thereof.

The server instructional application 138 obtains user data for the user 104 pertaining to performance of the activity by the user 104. According to some embodiments, the user data for the user 104 is the historical user data 152 for the user 104 stored in the data store 148. According to some embodiments, the user data for the user 104 is real-time data gathered by the video camera 114, the microphone 116, and/or the sensors 118 as the user 104 performs the activity while the client instructional application 110 is playing the instructional media 150 on the display 122. According to embodiments, the user data for the user 104 is a combination of the historical user data 152 for the user 104 and the real-time user data.

According to embodiments, the real-time feedback module 140 accesses the activity reference data 156 for the activity based upon an identifier for the activity. The real-time feedback module 140 performs a comparison between the activity reference data 156 for the user 104 and at least one of the historical user data 152 for the activity or the real-time user data. The real-time feedback module 140 generates feedback for the user 104 with respect to the activity based upon the comparison. The real-time feedback module 140 causes the feedback to be included in the user data. In an example, the activity reference data 156 includes an average target speed the user 104 is to maintain on a stationary bicycle for a period of time and the real-time user data for the user 104 includes an average speed that the user 104 is currently maintaining while the instructional media 150 is being presented on the display 122. The real-time feedback module 140 performs a comparison between the average target speed in the activity reference data 156 and the average speed that the user 104 is currently maintaining. When the average speed of the user 104 is greater than or equal to the target average speed, the real-time feedback module may generate feedback informing the user 104 that his/her targets are being met. When the average speed of the user 104 is less than the target average speed, the real-time feedback module 140 may generate feedback informing the user 104 that his/her targets are being not being met along with some encouragement (e.g., "You can do it!"). The real-time feedback module 140 may also include tips for the user 104 within the feedback that the user 104 may employ to perform the activity in a more desirable manner.

The server instructional application 138 provides the user data for the user 104 to the synthetic media application 142. The synthetic media application 142 generates the user-customized portion (i.e., a deepfake) of the instructional media 150 based upon the user data for the user 104, the audio model 144, and the video model 146. In an example, the user data for the user 104 described above includes text pertaining to the user 104. The synthetic media application 142 provides the text as input to the audio model 144. The audio model 144 outputs words reproduced in a voice of the instructor 202 based upon the input, despite the fact that the instructor 202 may have not actually ever uttered the words. Similarly, the synthetic media application 142 provides the text as input to the video model 146. The video model 146 generates images of the instructor 202 depicting the instructor 202 uttering the words, despite the fact that the instructor 202 may not have ever uttered the words. The synthetic media application 142 syncs the (generated) audible words with the (generated) images to generate the user-customized portion of the instructional media 150. The user-customized portion of the instructional media 150 may include encouragement to the user 104, acknowledgement of accomplishments of the user 104 with respect to the activity, and/or feedback to the user 104 with respect to the activity such that the user 104 is able to perform the activity in a more desirable manner. According to embodiments, the audible words include an identifier for the user 104 (e.g., a name of the user) and at least one additional word.

The synthetic media application 142 provides the user-customized portion of the instructional media 150 to the server instructional application 138. The server instructional application 138 causes the user-customized portion to be played on the user computing device 102. With more particularity, the server instructional application 138 transmits the user-customized portion to the client instructional application 110, where the client instructional application 110 plays the user-customized portion for the user 104 over the display 122 and the speaker 126.

According to embodiments, the server instructional application 138 or the client instructional application 110 transmit audio data of the user-customized portion of the instructional media 150 to a speaker that is separate from the user computing device 102 or to an audio reproduction facility, whereupon the speaker or the audio reproduction facility emit audible words generated in a voice of the instructor 202 based upon the audio data, where the audible words are based upon the user data for the user 104. Likewise, according to embodiments, the server instructional application 138 or the client instructional application 110 transmit video data of the user-customized portion of the instructional media 150 to a display that is separate from the user computing device 102 or to a video reproduction facility, whereupon the display or the video reproduction facility display generated images of the instructor 202 depicting the instructor 202 speaking the audible words as the speaker emits the audible words.

In an example, the user data includes text indicating that the user 102 is to be congratulated by name (e.g., Mike) for reaching a particular milestone (e.g., participating in an activity while viewing his second instructional video). In the example, the synthetic media application 142 obtains the text and generates a user-customized portion in which the instructor 202 appears to say "Congratulations to Mike! He is completing his second class today and is doing a great job! Keep up the good work!". The server instructional application 138 receives the user-customized portion personalized for Mike and transmits the user-customized portion to the client instructional application 110, whereupon the client instructional application 110 plays the user-customized portion over the display 122 and the speaker 126. In this manner, the computing system 100 is able to provide user-customized instructional media to a large number of users. Subsequent to causing the user-customized portion of the instructional media to be played, the server instructional application may cause another instructional portion or another user-customized portion to be played in a manner similar to that described above.

According to embodiments, the user-customized portion of the instructional media 150 is pre-generated prior to the instructional media 150 being played to the user 104. According to other embodiments, the user-customized portion of the instructional media 150 is generated while the instructional media 150 is being played to the user 104 (e.g., based upon real-time user data received from the video camera 114, the microphone 116, and/or the sensor 118).

According to some other embodiments, a first part of the user-customized portion is pre-generated and a second part of the user-customized portion is generated while the instructional media is being played to the user 104.

According to embodiments, the user-customized portion of the instructional media 150 is played at a predefined time occurring within the instructional media 150. According to embodiments, the server instructional application 138 dynamically selects a time period at which to play the user-customized portion based upon user data (e.g., real-time user data) of the user 104. In an example, upon receiving real-time user data indicating that a heart rate of the user 104 is high while performing an activity and hence the user 104 is laboring to complete the activity, the server instructional application 138 pauses the instructional portion of the instructional media 150 and causes the user-customized portion to be played to the user 104 (e.g., encouraging the user to complete the activity, advising to the user 104 to take a break, etc.). Upon playback of the user-customized portion, the server instructional application 138 causes play of the instructional portion to resume. According to embodiments, the server instructional application 138 may cause the user-customized portion to be played concurrently with the instructional portion. In an example, the server instructional application 138 causes audio of the instructional portion to be temporarily muted while a window is presented over at least a portion of the instructional media on the display 122, where the window includes the user-customized portion. According to embodiments, the user-customized portion may be presented as a cutaway (e.g., from a different angle than) to the instructional portion of the instructional media 150.

Figure 4:
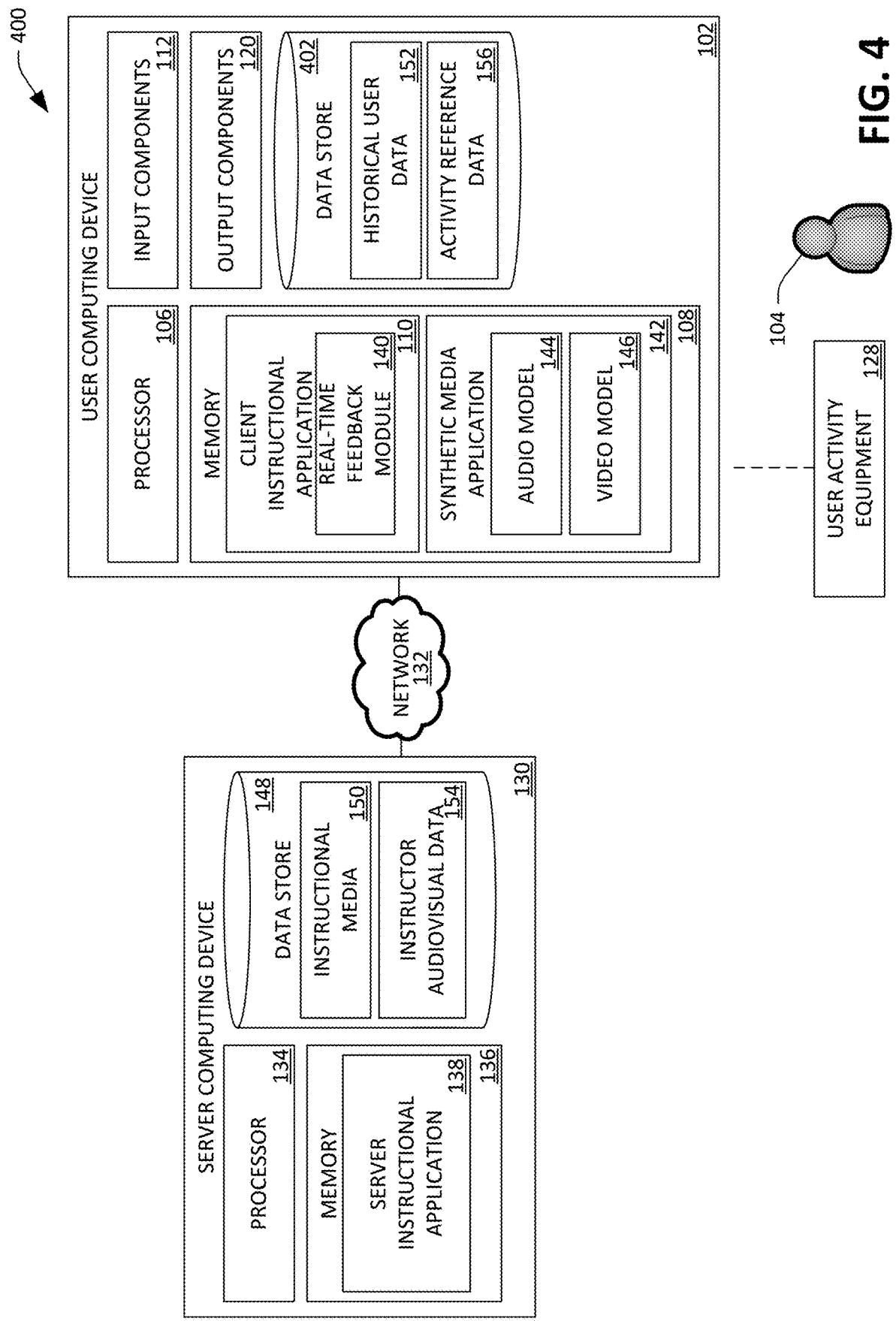
FIG. 4 is a functional block diagram of another computing system that facilitates customizing instructional content for a user.

Turning now to FIG. 4, a computing system 400 that facilitates customizing instructional content for the user 104 is illustrated. The computing system 400 is similar to the computing system 100 described above; however, in the computing system 400, the server computing device 130 does not include the real-time feedback module 140, the synthetic media application 142 (nor the audio model 144 or the video model 146), the historical user data 152, or the activity reference data 156. Instead, the real-time feedback module 140, the synthetic media application 142 (and the audio model 144 or the video model 146), the historical user data 152, and the activity reference data 156 are comprised by the user computing device 102. Although not depicted in FIG. 4, it is to be understood that the user computing device 102 in the computing system 400 includes the video camera 114, the microphone 116, the sensors 118, the display 122 that presents the graphical features 124, and the speaker 126.

In the computing system 400, the server instructional application 138 causes instructional portions of the instructional media 150 to be played on user computing device 102; however, the user-customized portion of the instructional media 150 is generated entirely on the user computing device 102 by the client instructional application 110 in a manner similar to that described above. As such, the computing system 400 enables the generation and playback of user-customized portions of instructional media without exchanging user data of the user 104 with the server computing device 130 over the network 132.

Figure 5:
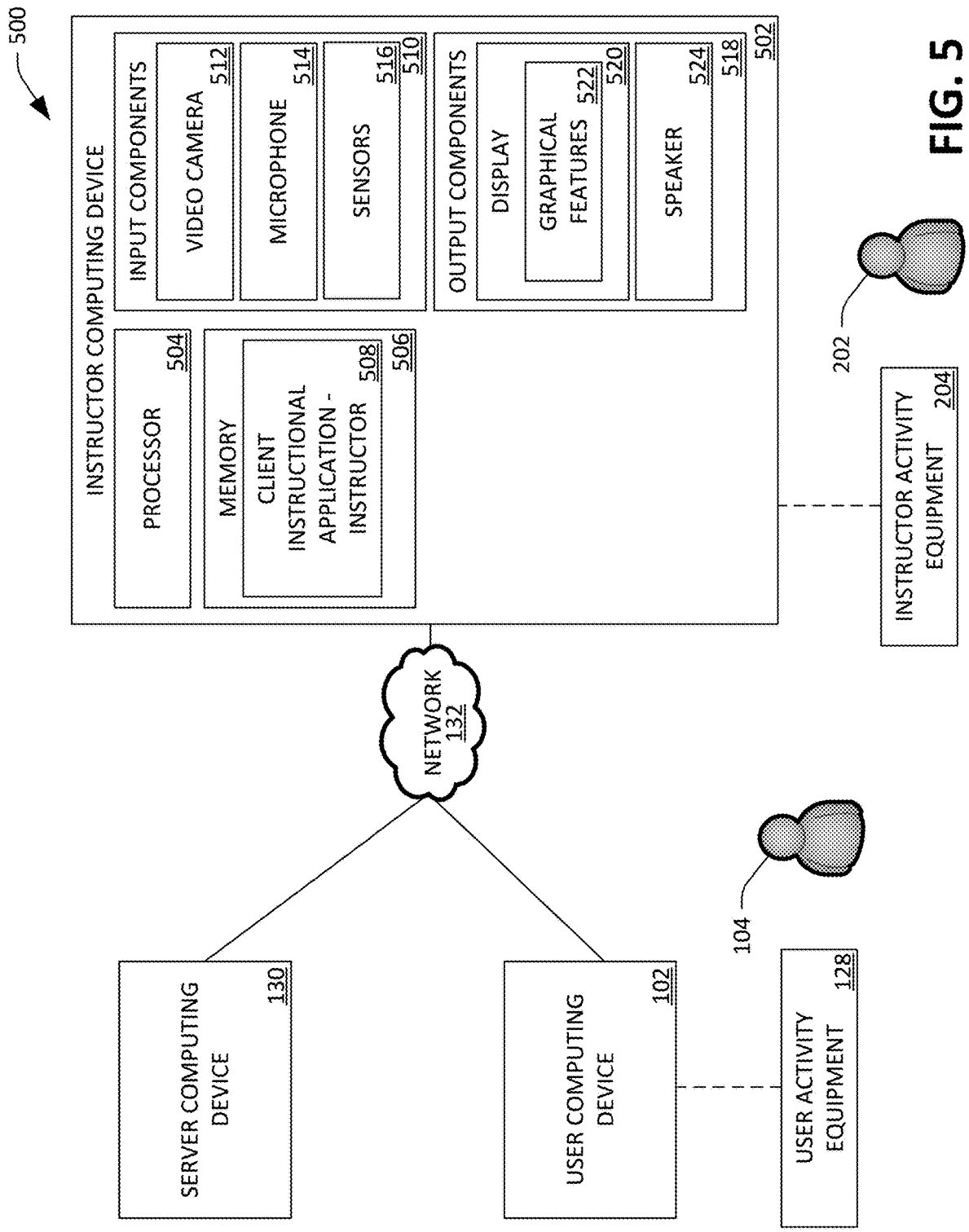
FIG. 5 is a functional block diagram of yet another computing system that facilitates customizing instructional content for a user.

Turning now to FIG. 5, a computing system 500 that facilitates customizing instructional content for the user 104 is illustrated. The computing system 500 includes the server computing device 130 and the user computing device 102 of the user 104 (according to the embodiment described in the description of FIG. 1 or the embodiment described in the description of FIG. 4).

The computing system 500 further includes an instructor computing device 502 of the instructor 202, where the instructor computing device 502 is similar or identical to the user computing device 102. The instructor computing device 502 may be in communication with the server computing device 130 and/or the user computing device 102 by way of the network 132. The instructor computing device 502 comprises a processor 504 and memory 506, where the memory 506 has an instructor version of the client instructional application 508 loaded therein (described below). The instructor computing device 502 further includes input components 512 (e.g., a video camera 512, a microphone 516, and sensors 516) that are similar or identical to the input components 112 (e.g., the video camera 114, the microphone 116, and the sensors 118) described above. The instructor computing device 502 further includes output components 518 (e.g., a display 520 upon which graphical features 522 are presented thereon and a speaker 524) that are similar or identical to the output components 120 (e.g., the display 122 and the speaker 126) described above.

The instructor computing device 502 may be utilized by the instructor 202 to live stream instructional media to the user computing device 102 (as well as other user computing devices). In an example, the client instructional application 508 receives a first indication that the live stream is to begin. The video camera 512 records images of the instructor 202 as the instructor 202 performs the activity (e.g., using the instructor activity equipment 204) and the microphone 516 records audio of the instructor 202 as the instructor performs the activity. The images and the audio form the instructional media. The client instructional application 508 transmits the instructional media in real-time to the server instructional application 138, whereupon the server instructional application 138 streams the instructional media in real-time to a plurality of computing devices operated by a plurality of users. According to embodiments, as the instructional media is being livestreamed to the plurality of users, the client instructional application 508 receives input from the instructor 202 indicating that user-customized portions of the instructional media are to be transmitted to each of the plurality of computing devices. The client instructional application 508 transmits a notification to the server instructional application 138, whereupon the server instructional application 138 generates the user-customized portions for each user using the techniques described above and causes the user-customized portions to be presented on each of the plurality of computing devices. Upon receiving a second indication from the instructor 202, the client instructional application 508 terminates the livestream.

The instructor computing device 502 may also be used to record the instructional portions of the instructional media 150. In an example, the client instructional application 508 receives a first indication from the instructor 202 that the instructional media 150 is to be recorded. The instructor 202 then begins to provide instruction with respect to the activity (e.g., using the instructor activity equipment 204). The video camera 512 captures video of the instructor 202 as the instructor 202 provides instruction and the microphone 514 captures audio as the instructor 202 provides the instruction. Upon receiving a second indication from the instructor that the instructional media 150 is completed, the client instructional application 508 ceases recording of the instructional media 150. The client instructional application 508 may edit the instructional media 150 to identify predetermined points within the instructional media 150 at which the user-customized portion for each user is to be inserted. The client instructional application 508 transmits the instructional media 150 to the server instructional application 138, whereupon the server instructional application may later cause the instructional media 150 to be played on computing devices of users (e.g., the user computing device 102 operated by the user 104). The client instructional application 508 may also record template videos (described above) of the instructor 202 that can be used to generate the user-customized portion of the instructional media 150.

According to embodiments, the server instructional application and/or the client instructional application may cause prerecorded videos to be played to the user 104 at certain points within the instructional media 150, where the prerecorded videos are not customized for the user 104.

Figure 6:
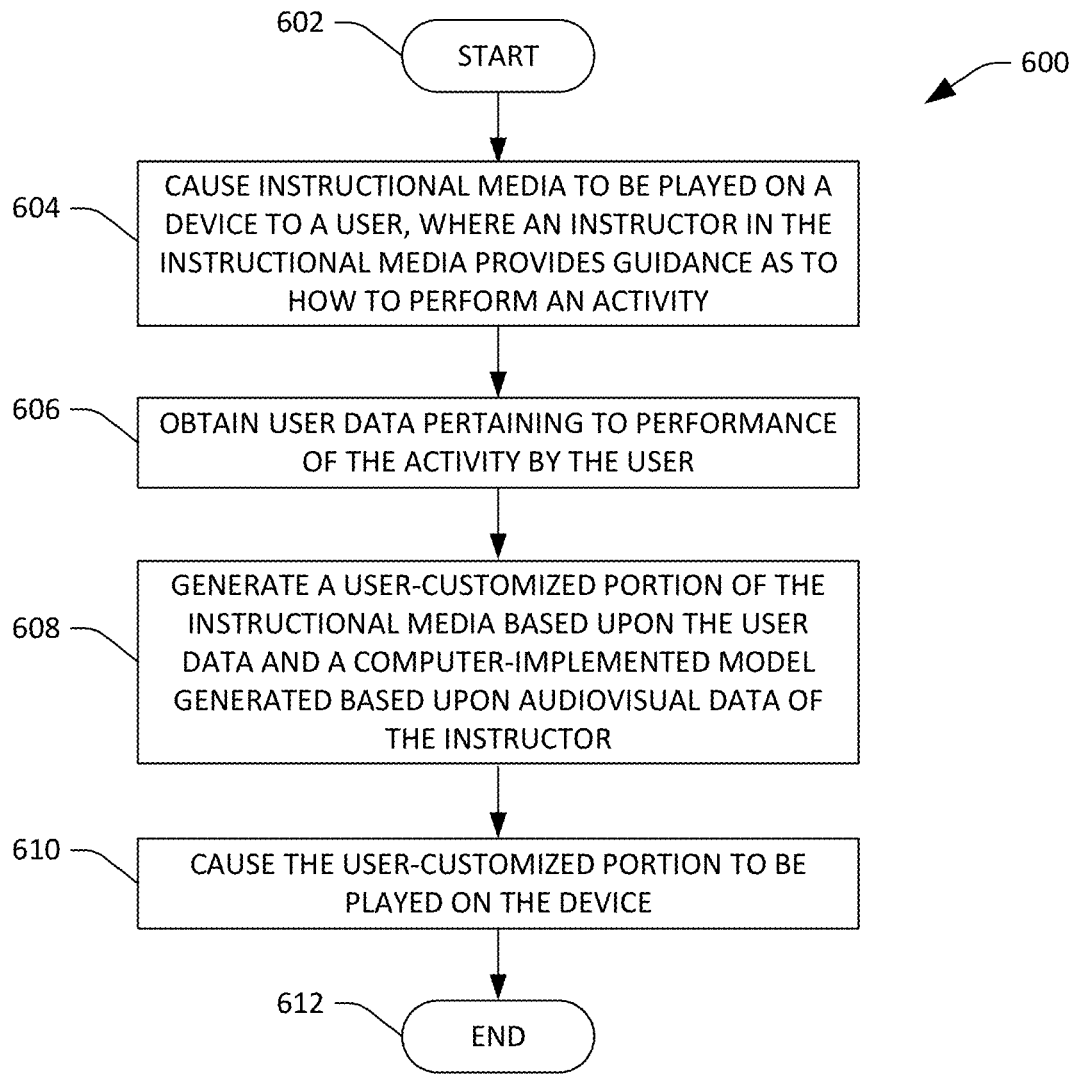
FIG. 6 is a flow diagram that illustrates a methodology performed by a computing system that facilitates customizing instructional content for a user.
Figure 7:
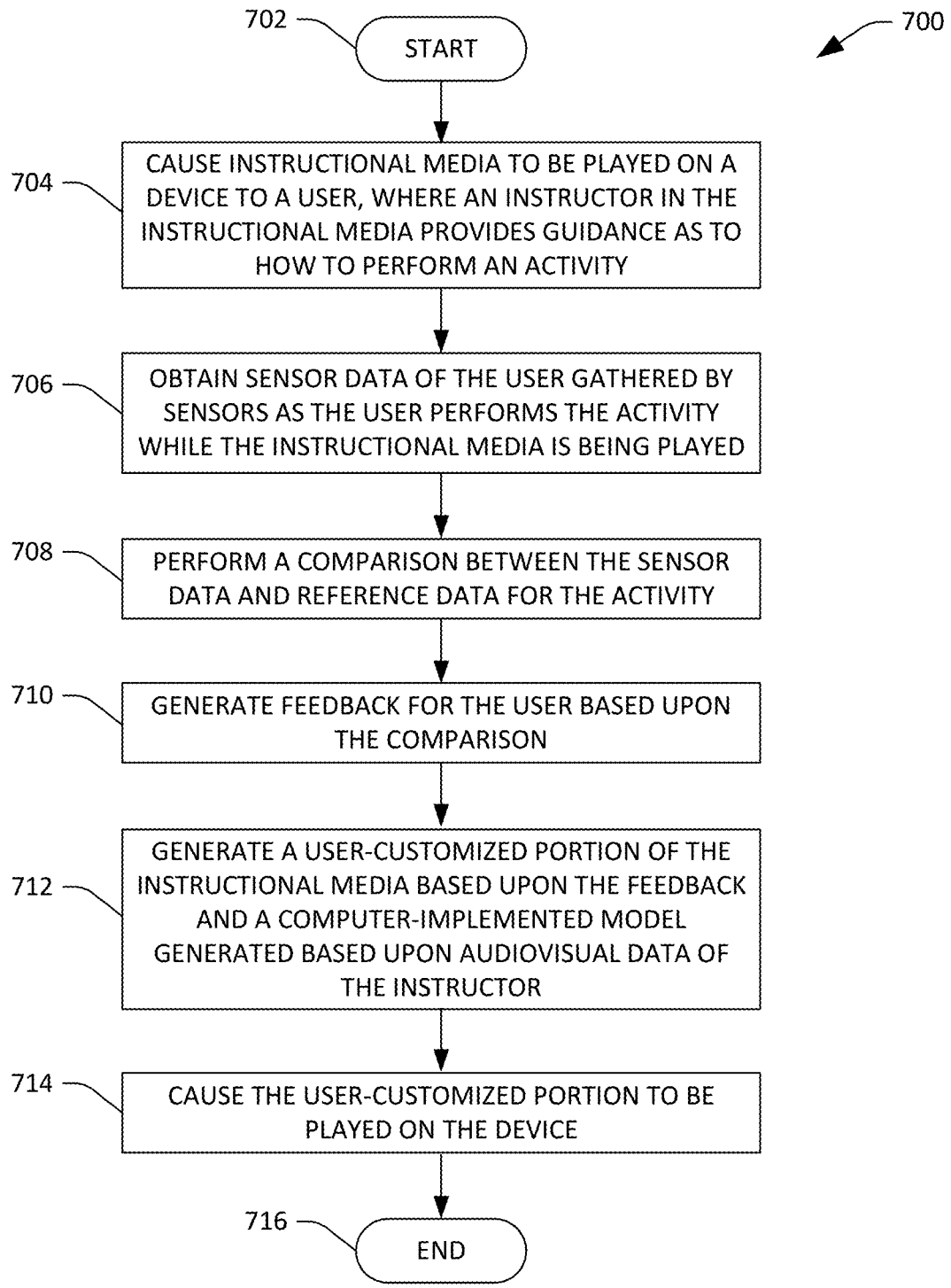
FIG. 7 is a flow diagram that illustrates a methodology performed by a computing system that facilitates presenting instructional content to a user.
Figure 8:
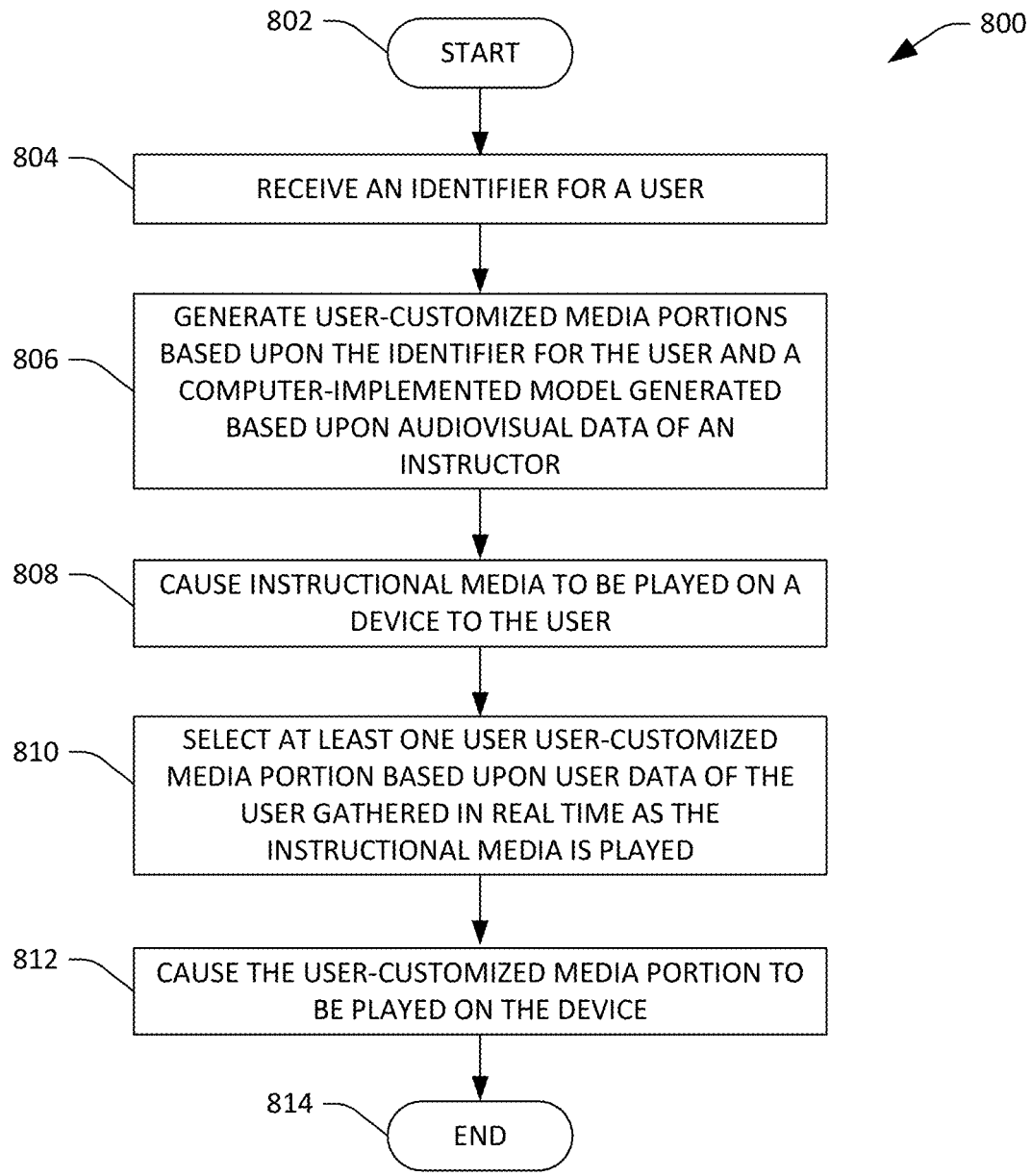
FIG. 8 is a flow diagram that illustrates a methodology performed by a computing system that facilitates presenting pre-generated instructional content to a user.

FIGS. 6-8 illustrate methodologies relating to customizing instructional content for a user. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 6, a methodology 600 performed by a computing system that facilitates customizing instructional content for a user is illustrated. The methodology 600 begins at 602, and at 604, the computing system causes instructional media to be played on a device to a user. The device comprises a speaker and a display. An instructor in the instructional media provides guidance as to how to perform an activity when the instructional media is played on the device. At 606, the computing system obtains user data pertaining to performance of the activity by the user. At 608, the computing system generates a user-customized portion of the instructional media based upon the user data and a computer-implemented model that is generated based upon audiovisual data of the instructor. At 610, the computing system causes the user-customized portion of the instructional media to be played on the device to the user. The speaker of the device emits audible words reproduced in a voice of the instructor as the user-customized portion is played on the device, where the audible words are based upon the user data. The display of the device displays generated images of the instructor depicting the instructor speaking the audible words as the speaker of the device emits the audible words. The methodology 600 concludes at 612.

Turning now to FIG. 7, a methodology 700 performed by a computing system that facilitates presenting instructional content to a user is illustrated. The methodology 700 begins at 702, and at 704, the computing system causes instructional media to be played on a device to a user. An instructor in the instructional media provides guidance as to how to perform an activity when the instructional media is played on the device. At 706, the computing system obtains sensor data of the user gathered by sensors as the user performs the activity while the instructional media is being played to the user. At 708, the computing system performs a comparison between the sensor data and reference data for the activity.

At 710, the computing system generates feedback for the user based upon the comparison. At 712, the computing system generates a user-customized portion of the instructional media based upon the feedback and a computer-implemented model that has been generated based upon audiovisual data of the instructor. At 714, the computing system causes the user-customized portion of the instructional media to be played on the device. The device emits audible words reproduced in a voice of the instructor as the user-customized portion is played on the device, where the audible words are based upon the feedback. The device displays generated images of the instructor depicting the instructor speaking the words as the device emits the audible words. The methodology 700 concludes at 716.

With reference to FIG. 8, a methodology 800 performed by a computing system that facilitates presenting pre-generated instructional content to a user is illustrated. The methodology 800 begins at 802, and at 804, the computing system receives an identifier for a user. At 806, the computing system generates user-customized media portions (e.g., video portions) that are to be played as an addition to instructional media (e.g., an instructional video) based upon the identifier for the user and a computer-implemented model that is generated based upon audiovisual data of an instructor that appears in the instructional media. At 808, the computing system causes the instructional media to be played on a device to the user, where the instructor in the instructional media provides guidance as to how to perform an activity while the instructional media is played on the device. The user attempts to perform the activity while the instructional media is played on the device.

At 810, the computing system selects at least one user-customized media portion from amongst the user-customized media portions based upon user data for the user gathered in real time by sensors as the instructional media is played on the device. At 812, the computing system causes the at least one user-customized media portion to be played on the device to the user. A speaker of the device emits audible words generated in a voice of the instructor as the at least one user-customized media portion is played on the device, where the audible words include the identifier for the user. A display of the device displays generated images of the instructor depicting the instructor speaking the audible words as the speaker emits the audible words. In an example where the activity is riding a stationary bicycle, the identifier for the user is "Bob", and the user data indicates that the user is struggling to maintain a target speed while riding the stationary bicycle, the at least one user-customized media portion depicts the instructor saying: "Hang in there Bob! You can do it!" In another example where the user is exceeding a target speed, the at least one user-customized media portion depicts the instructor saying: "You just did that in record time Bob! Congratulations!". The methodology 800 concludes at 814.

Figure 9:
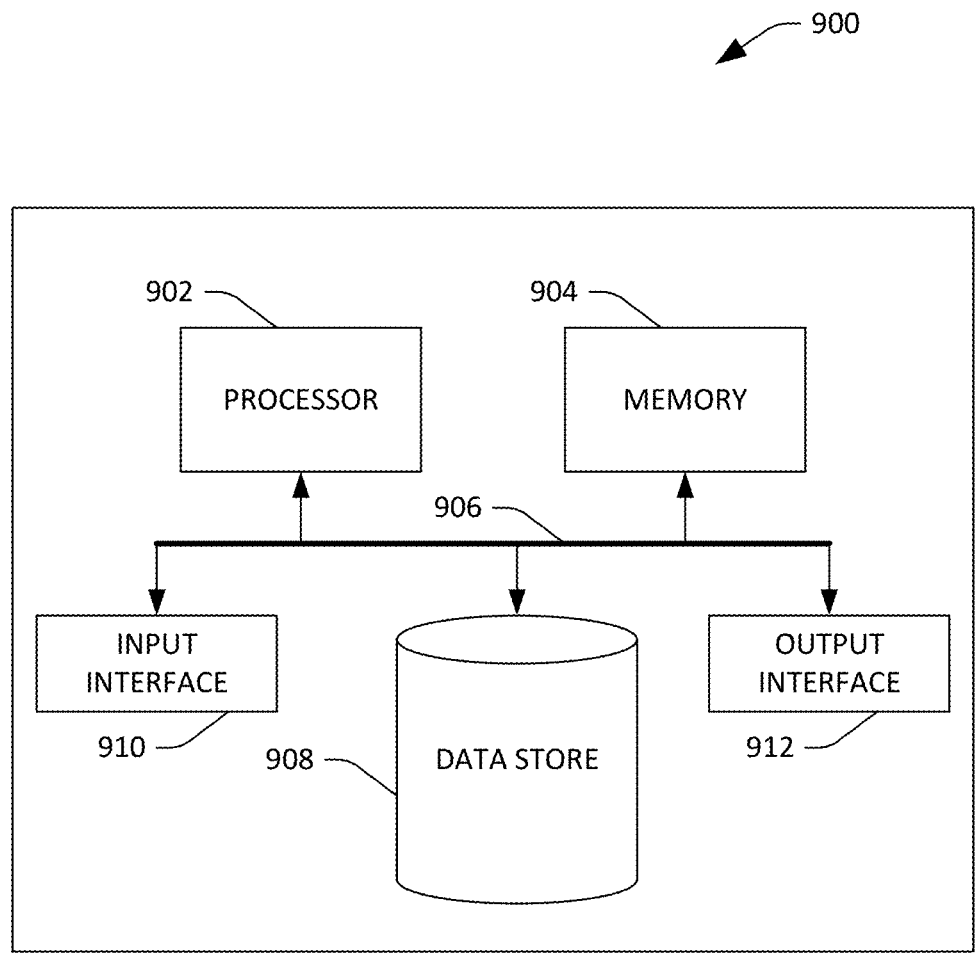
FIG. 9 depicts a computing device.

Referring now to FIG. 9, a high-level illustration of an exemplary computing device 900 that can be used in accordance with the systems and methodologies disclosed herein is illustrated. For instance, the computing device 900 may be used in a system that customizes instructional content for a user. By way of another example, the computing device 900 can be used in a system that displays customized instructional content to a user. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store instructional media (such as instructional videos), historical user data, user data, instructor audiovisual data, activity reference data, computer-implemented models, etc.

The computing device 900 additionally includes a data store 908 that is accessible by the processor 902 by way of the system bus 906. The data store 908 may include executable instructions, instructional media (such as instructional videos), historical user data, user data, instructor audiovisual data, activity reference data, computer-implemented models, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

It is contemplated that the external devices that communicate with the computing device 900 via the input interface 910 and the output interface 912 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 900 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. Such computer-readable storage media can include random-access memory (RAM), read-only memory (ROM), electrically erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present disclosure relates to customizing instructional content for a user according to at least the examples provided in the section below:

(A1) In one aspect, some embodiments include a method (e.g., 600) executed by a processor (e.g., 134, 106). The method includes causing (e.g., 604) instructional media (e.g., 150) to be played on a device (e.g., 102) to a user (e.g., 104), the device comprising a speaker (e.g., 126) and a display (e.g., 122), where an instructor (e.g., 202) in the instructional media provides guidance as to how to perform an activity when the instructional media is played on the device. The method further includes obtaining (e.g., 606) user data, the user data pertaining to performance of the activity by the user. The method also includes generating (e.g., 608) a user-customized portion (e.g., 304) of the instructional media based upon the user data and a computer-implemented model (e.g., 144, 146) that is generated based upon audiovisual data (e.g., 154) of the instructor. The method additionally includes causing (e.g., 610) the user-customized portion of the instructional media to be played on the device to the user, where the speaker of the device emits audible words generated in a voice of the instructor as the user-customized portion is played on the device, where the audible words are based upon the user data, and further where the display of the device displays generated images of the instructor depicting the instructor speaking the audible words as the speaker emits the audible words.

(A2) In some embodiments of the method of A1, the method further includes causing the instructional media to be played on a second device to a second user, the second device including a second speaker and a second display, where the instructor in the instructional media provides guidance as to how to perform the activity when the instructional media is played on the second device. The method additionally includes obtaining second user data pertaining to performance of the activity by the second user. The method also includes generating a second user-customized portion of the instructional media based upon the second user data and the computer-implemented model. The method additionally includes causing the second user-customized portion of the instructional media to be played on the second device to the second user, where the second speaker of the second device emits second audible words reproduced in the voice of the instructor as the second user-customized portion is played on the second device, where the second audible words are based upon the second user data, and further where the second display of the second device displays second generated images of the instructor depicting the instructor speaking the second audible words as the second speaker emits the second audible words.

(A3) In some embodiments of any of the methods of A1-A2, the user-customized portion of the instructional media is additionally generated based upon reference data (e.g., 156) for the activity, where the reference data for the activity is indicative of a correct manner of performing the activity.

(A4) In some embodiments of any of the methods of A1-A3, the computer-implemented model includes an audio model (e.g., 144) that is configured to generate the audible words generated in the voice of the instructor and a video model (e.g., 146) that is configured to create the generated images of the instructor depicting the instructor speaking the audible words.

(A5) In some embodiments of any of the methods of A1-A4, the user-customized portion of the instructional media is played upon the instructional media reaching a predetermined point of playback.

(A6) In some embodiments of any of the methods of A1-A5, the generated images of the instructor include facial images of the instructor.

(B1) In another aspect, some embodiments include a computing system (e.g., 100, 400) that includes a processor (e.g., 134, 106) and memory (e.g., 136, 108). The memory stores instructions that, when executed by the processor, cause the processor to perform any of the methods described herein (e.g., any of A1-A6).

(C1) In yet another aspect, a computer-readable storage medium includes instructions that, when executed by a processor (e.g., 134, 106) of a computing system (e.g., 100, 400), cause the processor to perform any of the methods described herein (e.g., any of A1-A6).

(D1) In another aspect, some embodiments include a method executed by a computing system (e.g., 100, 400) that includes a processor (e.g., 134, 106) and memory (e.g., 136, 108). The method includes causing instructional media (e.g., 150) to be played to a user (e.g., 104) over a speaker (e.g., 126) and a display (e.g., 122), where an instructor (e.g., 202) in the instructional media provides guidance as to how to perform an activity when the instructional media is played. The method further includes obtaining user data while the instructional media is played to the user, the user data pertaining to performance of the activity by the user. The method additionally includes generating a user-customized portion (e.g., 304) of the instructional media based upon the user data and a computer-implemented model (e.g., 144, 146) that is generated based upon audiovisual data (e.g., 15) of the instructor. The method also includes causing the user-customized portion of the instructional media to be played to the user, where causing the user-customized portion of the instructional media to be played to the user includes (i) sending audio data of the user-customized portion of the instructional media to the speaker, where based upon the audio data, the speaker emits audible words generated in a voice of the instructor, where the audible words are based upon the user data and (ii) sending video data of the user-customized portion of the instructional media to the display, where based upon the video data, the display displays generated images of the instructor depicting the instructor speaking the audible words as the speaker emits the audible words.

(D2) In some embodiments of the method of D1, the instructional media is pre-recorded video.

(D3) In some embodiments of the method of D1, the instructional media is livestreamed video.

(D4) In some embodiments of any of the methods of D1-D3, the instructional media comprises a first portion (e.g., 302) and a second portion (e.g., 306), where the first portion of the instructional media is played prior to the user-customized portion of the instructional media being played to the user, and the method further includes subsequent to causing the user-customized portion of the instructional media to be played to the user, causing the second portion of the instructional media to be played to the user.

(D5) In some embodiments of any of the methods of D1-D4, the activity is a type of exercise.

(D6) In some embodiments of the method of D5, the computing system is comprised by exercise equipment (e.g., 128) that the user utilizes to perform the exercise.

(D7) In some embodiments of any of the methods of D1-D6, the user data comprises an identifier for the user, where the audible words emitted by the speaker include the identifier for the user and at least one additional word.

(D8) In some embodiments of any of the methods of D1-D7, the user data comprises historical data (e.g., 152) of the user with respect to the activity, where the audible words emitted by the speaker are based upon the historical data.

(D9) In some embodiments of any of the methods of D1-D8, the user data includes sensor data of the user that is generated by a sensor (e.g., 118) as the user is performing the activity while the instructional media is being played, where the audible words emitted by the speaker are based upon the sensor data.

(D10) In some embodiments of the method of D9, wherein the sensor includes: a camera (e.g., 114); a microphone (e.g., 116); an accelerometer; a speedometer; or a heart rate monitor, and the sensor data includes: an image; an audio recording; an acceleration; a speed; or a heart rate of the user.

(D11) In some embodiments of any of the methods of D1-D10, the user-customized portion of the instructional media is generated responsive to the user data being obtained.

(E1) In another aspect, a computing system (e.g., 100, 400) includes a processor (e.g., 134, 106) and memory (e.g., 136, 108). The memory stores instructions that, when executed by the processor, cause the processor to perform any of the methods described herein (e.g., any of D1-D11).

(F1) In yet another aspect, a computer-readable storage medium includes instructions that, when executed by a processor (e.g., 134, 106) of a computing system (e.g., 100, 400), cause the processor to perform any of the methods described herein (e.g., any of D1-D11).

(G1) In another aspect, some embodiments include a method executed by a computing system (e.g., 100, 140) that includes a processor (e.g., 134, 106) and memory (e.g., 136, 108). The method includes playing instructional media (e.g., 150) on a device (e.g., 102) to a user (e.g., 104), the device includes a speaker (e.g., 126) and a display (e.g., 122), where an instructor (e.g., 202) in the instructional media provides guidance as to how to perform an activity when the instructional media is played on the device. The method further includes obtaining user data pertaining to performance of the activity by the user. The method additionally includes generating a user-customized portion (e.g., 304) of the instructional media based upon the user data and a computer-implemented model (e.g., 144, 146) that is generated based upon audiovisual data (e.g., 154) of the instructor. The method also includes playing the user-customized portion of the instructional media on the device to the user, where the speaker of the device emits audible words reproduced in a voice of the instructor as the user-customized portion is played on the device, where the audible words are based upon the user data, and further where the display of the device displays generated images of the instructor depicting the instructor speaking the audible words as the speaker emits the audible words.

(G2) In some embodiments of the method of G1, the device is included in the computing system.

(G3) In some embodiments of any of the methods of G1-G2, the user performs the activity while the instructional media is played on the device, where the user data comprises images and audio of the user as the user performs the activity, where the images are captured by a video camera (e.g., 114) of the device and the audio is captured by a microphone (e.g., 116) of the device.

(H1) In yet another aspect, a computing system (e.g., 100, 400) includes a processor (e.g., 134, 106) and memory (e.g., 136, 108). The memory stores instructions that, when executed by the processor, cause the processor to perform any of the methods described herein (e.g., any of G1-G3).

(I1) In yet another aspect, a computer-readable storage medium includes instructions that, when executed by a processor (e.g., 134, 106) of a computing system (e.g., 100, 400), cause the processor to perform any of the methods described herein (e.g., any of G1-G3).

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system, comprising:
    a processor; and
    memory storing instructions that, when executed by the processor, cause the processor to perform acts comprising:
    causing instructional media to be played to a user over a speaker and a display, wherein a human instructor in the instructional media provides guidance as to how to perform an activity when the instructional media is played, and further wherein the instructional media comprises a first portion and a second portion;
    obtaining user data while the instructional media is played to the user, the user data pertaining to performance of the activity by the user;
    generating, by a computer-implemented model that is trained based upon audiovisual data of the human instructor, a user-customized portion of the instructional media, where the computer-implemented model generates the user-customized portion of the instructional media based upon the user data; and
    causing the first portion of the instructional media, the user-customized portion of the instructional media, and the second portion of the instructional media to be played to the user comprises:
sending audio data of the user-customized portion of the instructional media to the speaker, wherein based upon the audio data, the speaker emits audible words in a voice of the human instructor; and
sending video data of the user-customized portion of the instructional media to the display, wherein based upon the video data, the display displays images of the human instructor depicting the human instructor speaking the audible words as the speaker emits the audible words.

2. The computing system of claim 1, wherein the instructional media is pre-recorded video.

3. The computing system of claim 1, wherein the instructional media is livestreamed video.

4. The computing system of claim 1, wherein the first portion of the instructional media is played prior to the user-customized portion of the instructional media being played to the user and
the second portion of the instructional media is played to the user subsequent to the user-customized portion of the instructional media being played to the user.

5. The computing system of claim 1, wherein the activity is a type of exercise.

6. The computing system of claim 5, wherein the computing system is comprised by exercise equipment that the user utilizes to perform the exercise.

7. The computing system of claim 1, wherein the user data comprises an identifier for the user, wherein the audible words emitted by the speaker include the identifier for the user and at least one additional word.

8. The computing system of claim 1, wherein the user data comprises historical data of the user with respect to the activity, wherein the audible words emitted by the speaker are based upon the historical data.

9. The computing system of claim 1, wherein the user data comprises sensor data of the user that is generated by a sensor as the user is performing the activity while the instructional media is being played, wherein the audible words emitted by the speaker are based upon the sensor data.

10. The computing system of claim 9, wherein the sensor comprises:
a camera;
a microphone;
an accelerometer;
a speedometer; or
a heart rate monitor,
wherein the sensor data comprises:
an image;
an audio recording;
an acceleration;
a speed; or
a heart rate of the user.

11. The computing system of claim 1, wherein the user-customized portion of the instructional media is generated responsive to the user data being obtained.

12. A method performed by a processor, comprising:
causing instructional media to be played on a device to a user, the device comprising a speaker and a display, wherein a human instructor in the instructional media provides guidance as to how to perform an activity when the instructional media is played on the device, and further wherein the instructional media comprises a first portion and a second portion;
obtaining user data while the instructional media is played to the user, the user data pertaining to performance of the activity by the user;
generating, by a computer-implemented model that is trained based upon audiovisual data of the human instructor, a user-customized portion of the instructional media, where the computer-implemented model generates the user-customized portion of the instructional media based upon the user data; and
causing the first portion of the instructional media, the user-customized portion of the instructional media, and the second portion of the instructional media to be played on the device to the user;
sending audio data of the user-customized portion of the instructional media to the speaker, wherein the audio data of the user-customized portion of the instructional media comprises audible words in a voice of the human instructor;
sending video data of the user-customized portion of the instructional media to the display,
wherein the video data of the user-customized portion of the instructional media comprises images of the human instructor depicting the human instructor speaking the audible words.

13. The method of claim 12, further comprising:
causing the instructional media to be played on a second device to a second user;
obtaining second user data pertaining to performance of the activity by the second user;
generating, by the computer-implemented model, a second user-customized portion of the instructional media, where the computer-implemented model generates the second user-customized portion of the instructional media based upon the second user data; and
causing the second user-customized portion of the instructional media to be played on the second device to the second user, wherein the device user-customized portion of the instructional media comprises second audible words in the voice of the human instructor, wherein the second user-customized portion of the instructional media comprises second generated images of the human instructor depicting the human instructor speaking the second audible words, and further wherein the user-customized portion of the instructional media and the second user-customized portion of the instructional media are different from one another.

14. The method of claim 12, wherein the computer-implemented model generates the user-customized portion of the instructional media is-additionally based upon reference data for the activity, where the reference data for the activity is indicative of a correct manner of performing the activity.

15. The method of claim 12, wherein the computer-implemented model comprises an audio model that is configured to generate the audible words generated in the voice of the human instructor and a video model that is configured to create the images of the human instructor depicting the human instructor speaking the audible words.

16. The method of claim 12, wherein the user-customized portion of the instructional media is played upon the instructional media reaching a predetermined point of playback.

17. The method of claim 12, wherein the images of the human instructor include facial images of the human instructor.

18. A computer-readable storage medium comprising instructions that, when executed by a processor of a computing system, perform acts comprising:

playing instructional media on a device to a user, the device comprising a speaker and a display, wherein a human instructor in the instructional media provides guidance as to how to perform an activity when the instructional media is played on the device, and further wherein the instructional media comprises a first portion and a second portion;

while the instructional media is being played, obtaining user data pertaining to performance of the activity by the user;

generating, by a computer-implemented model that is trained based upon audiovisual data of the human instructor, a user-customized portion of the instructional media, wherein the computer-implemented model generates the user-customized portion of the instructional media based upon the user data, and further wherein the user-customized portion of the instructional media comprises:

audible words in a voice of the human instructor; and images of the human instructor that depict the human instructor emitting the audible words; and playing the first portion of the instructional media, the user-customized portion of the instructional media, and the second portion of the instructional media on the device to the user, wherein the speaker of the device emits the audible words while the display of the device displays the generated images of the human instructor.

19. The computer-readable storage medium of claim 18, wherein the device is comprised by the computing system.

20. The computer-readable storage medium of claim 18, wherein the user data comprises images and audio of the user as the user performs the activity, and further wherein the images are captured by a video camera of the device and the audio is captured by a microphone of the device.

* * * * *